Dec. 19, 1961 J. L. BERRYHILL ET AL 3,014,163

SEQUENTIAL PROGRAM SWITCHER

Filed March 31, 1958 4 Sheets-Sheet 1

INVENTORS
JOSEPH L. BERRYHILL
ROBERT G. SNOW
BY Naylor & Neal
ATTORNEYS

SEQUENTIAL PROGRAM SWITCHER

Filed March 31, 1958 4 Sheets-Sheet 2

INVENTORS
JOSEPH L. BERRYHILL
ROBERT G. SNOW
BY Naylor & Neal
ATTORNEYS

SEQUENTIAL PROGRAM SWITCHER

Filed March 31, 1958 4 Sheets-Sheet 3

INVENTORS
JOSEPH L. BERRYHILL
ROBERT G. SNOW
BY Naylor & Neal
ATTORNEYS

INVENTORS
JOSEPH L. BERRYHILL
ROBERT G. SNOW
BY Naylor & Neal
ATTORNEYS

United States Patent Office 3,014,163

Patented Dec. 19, 1961

3,014,163

SEQUENTIAL PROGRAM SWITCHER

Joseph L. Berryhill, San Anselmo, and Robert G. Snow, San Francisco, Calif., assignors to The Chronicle Publishing Company, San Francisco, Calif., a corporation of Nevada Filed Mar. 31, 1958, Ser. No. 725,046
18 Claims. (Cl. 317—139)

This invention pertains to means for switching programs of a television station and the like in a predetermined time sequence, and more particularly to a means for implementing the timed control of a series of program segments as applied to the operation of a television station.

In television station switching it is customary to utilize an operator to turn the equipment on and off and to connect video and audio channels to their respective transmitters at particular desired times.

The device contemplated by this invention utilizes a timing means such as, for example, a stepping switch which is adapted to step or to generate unique switch positions for each unique unit of time. For convenience, a second is used as the unit of time. A plurality of time selecting switches are connected to the timed stepping switches, each time selecting switch being adapted to be positioned to select a time when voltages are applied to the movable arm of a plurality multi-position function selecting switches. Each of the fixed terminals on the multi-position function selecting switches is connected to a different piece of equipment, audio channel, video channel and the like to be turned on, connected or disconnected in timed sequence which depends upon the setting of the associated time selecting switches.

This device can best be visualized from the particular embodiment described hereinafter. In the device to be described a pair of stepping switches which are adapted to be reset to a zero position are connected to be stepped by a timed stepping-pulse voltage after a starting switch is closed to thereby cause the stepping switches to have a unique position for each unit of time up to, for example, 199 seconds from the starting time.

There is associated with the stepping switches a plurality of pairs of tapped time selecting switches, of which each pair has a unique adjustable position which corresponds to each period of time of, for example, 199 seconds. Each switch of the plurality of pairs of time selecting switches is adapted to be manually positioned and is connected to control a multi-terminal relay when the positions of the particular pair of switches coincide with the corresponding timed positions of the stepping switches.

There is a separate multi-terminal relay associated with each pair of time selecting switches. Each multi-terminal relay is adapted, when closed, to connect control voltages to the rotor or movable arm of a plurality of multi-tap function selecting switches, each tap of which is connected to a different device to be controlled. Identical but separate function selecting switches are connected to each separate multi-terminal relay with the fixed taps of said function switches connected in parallel, so that operation of any one of the said multi-terminal relays connects control voltages to predetermined controlled devices.

It is also contemplated by this invention that the timing or stepping means can be automatically stopped at some predetermined time by the operation of a switch connected to a preselected one of the above mentioned multi-terminal relays so that at a particular time after the device of this invention is started, the operation of timed stepping switches of this invention is suspended until manually restarted. Thus a means is provided for stopping and holding the stepping switches utilized by this invention at some predetermined position, usually other than their zero or starting position. It is also contemplated that means is provided for returning the timing means or stepping switch means to its zero or starting position.

Thus the device contemplated by this invention can be utilized to turn equipment on and off, to douse moving picture projector lamps, to connect or disconnect the video and audio channels from their respective transmitters, and the like, at predetermined times after some initial starting time.

The device contemplated by this invention provides extreme flexibility in the operation of the many devices found in television stations. For example, a program segment can be programmed to start at a predetermined time while simultaneous provision is made for starting the necessary equipment at predetermined times prior to the connection of video and audio channels to their respective transmitters. In the event that the program segment is an untimed segment, that is, one in which the duration is unknown, all preparation up to the start of the untimed segment can be automatically started, the timing means can then be automatically stopped and at the termination of the untimed segment the timer can be manually started again. The remaining operations which are determined by the position of the various time selecting and function selecting switches can be programmed for automatic control as if the untimed segment had not been present.

It is therefore an object of this invention to provide means for automatically programming, in predetermined time sequence, the operation of a television station.

It is another object of this invention to provide an automatically controlled sequential program switches.

It is another object of this invention to provide a flexible switching system adapted to time and program the operation of television stations, and the like.

It is a more particular object of this invention to provide means for automatically controlling the operation of studio and transmission equipment of a transmitting station in accordance with a predetermined time sequence, and to further provide means for automatically stopping said sequence at some predetermined time.

Other objects will become apparent from the following description taken in connection with the accompanying drawings, in which.

Figure 3:
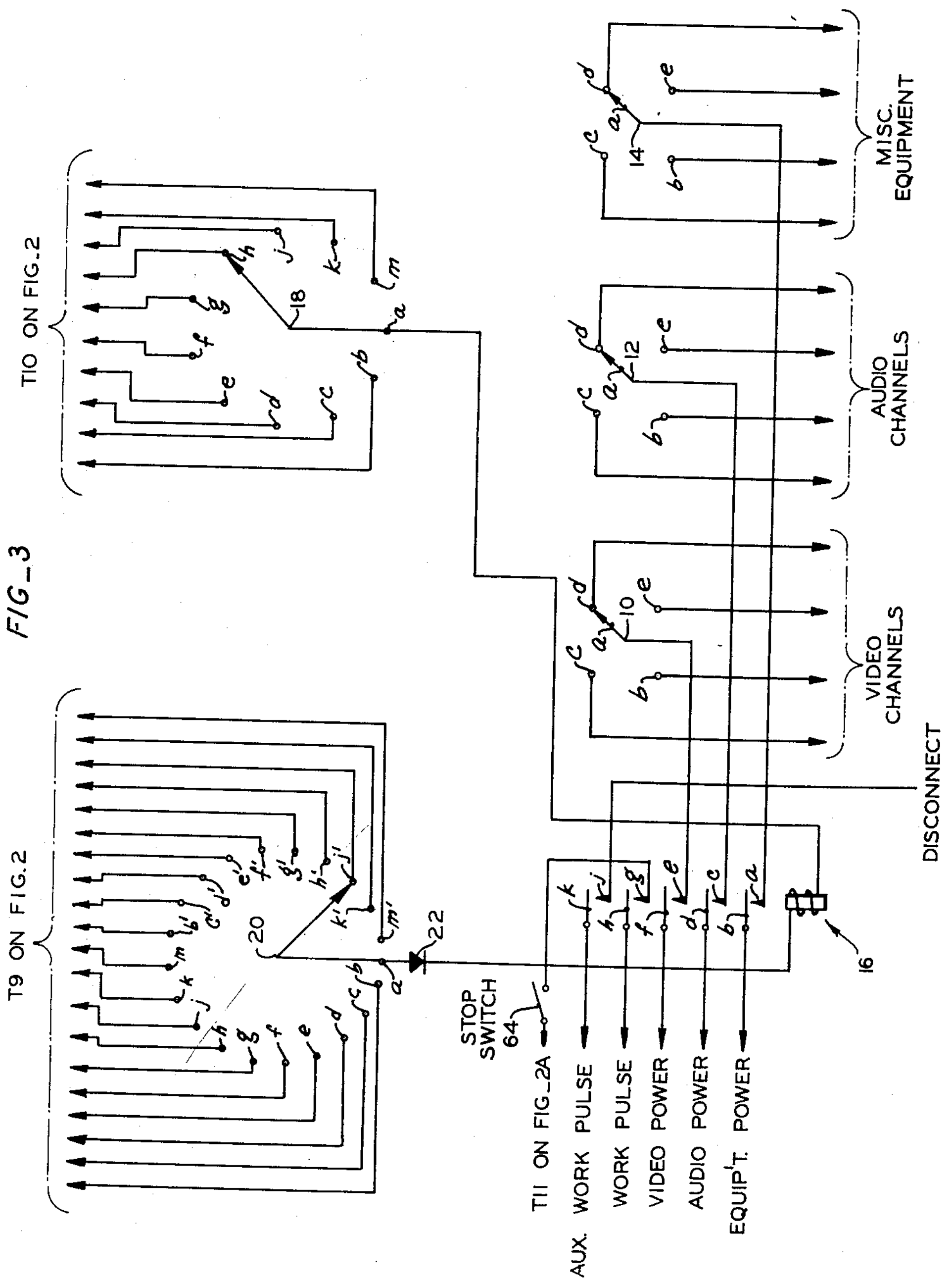
FIGURE 3 is a schematic diagram of typical ten and twenty position time selecting switches adapted to control a multi-terminal relay to channel pulses through multi-tap function selecting switches.

Referring now to the block diagram of FIGURE 1 in which a typical embodiment of this invention is shown, multiple tap function selecting switches 10, 12 and 14, to be described more fully hereinafter in connection with the description of FIGURE 3, are connected to have voltages applied to their movable arms through the terminals of multi-terminal relay 16. Additional multi-tap function selecting switches (represented by the dotted line to the right of multi-tap switch 14) may optionally be connected to have voltages applied to their movable arms through terminals of multi-terminal relay 16. Multi-terminal relay 16 is connected to be closed when twenty position time selecting switch 20 is aligned with twenty position stepping switch means 26 and when ten position time selecting switch 18 is aligned with ten position stepping switch means 24.

Figure 2:
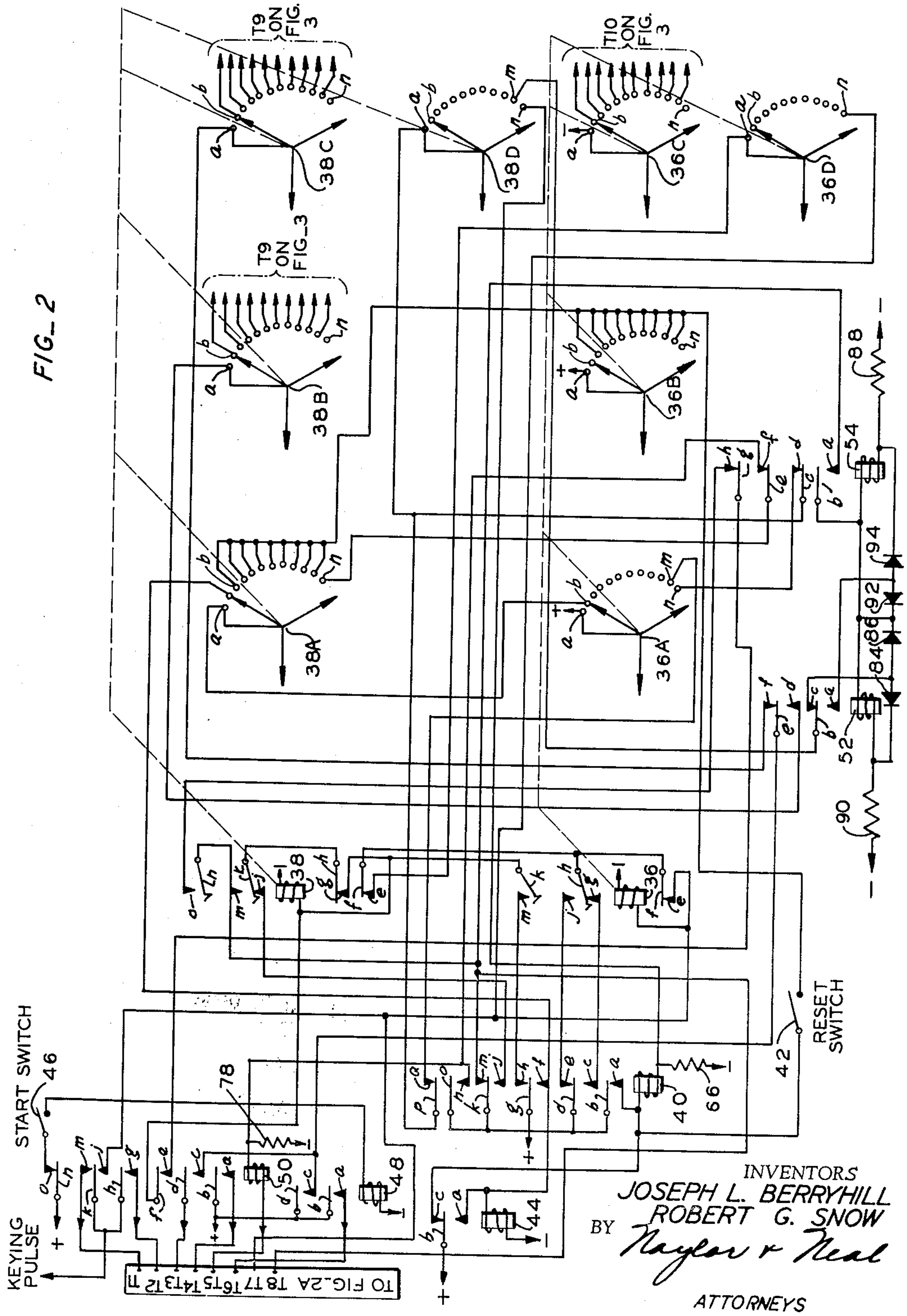
FIGURE 2 is a schematic diagram of the stepping switch means and associated control circuitry utilized in a particular embodiment of this invention.
Figure 2A:
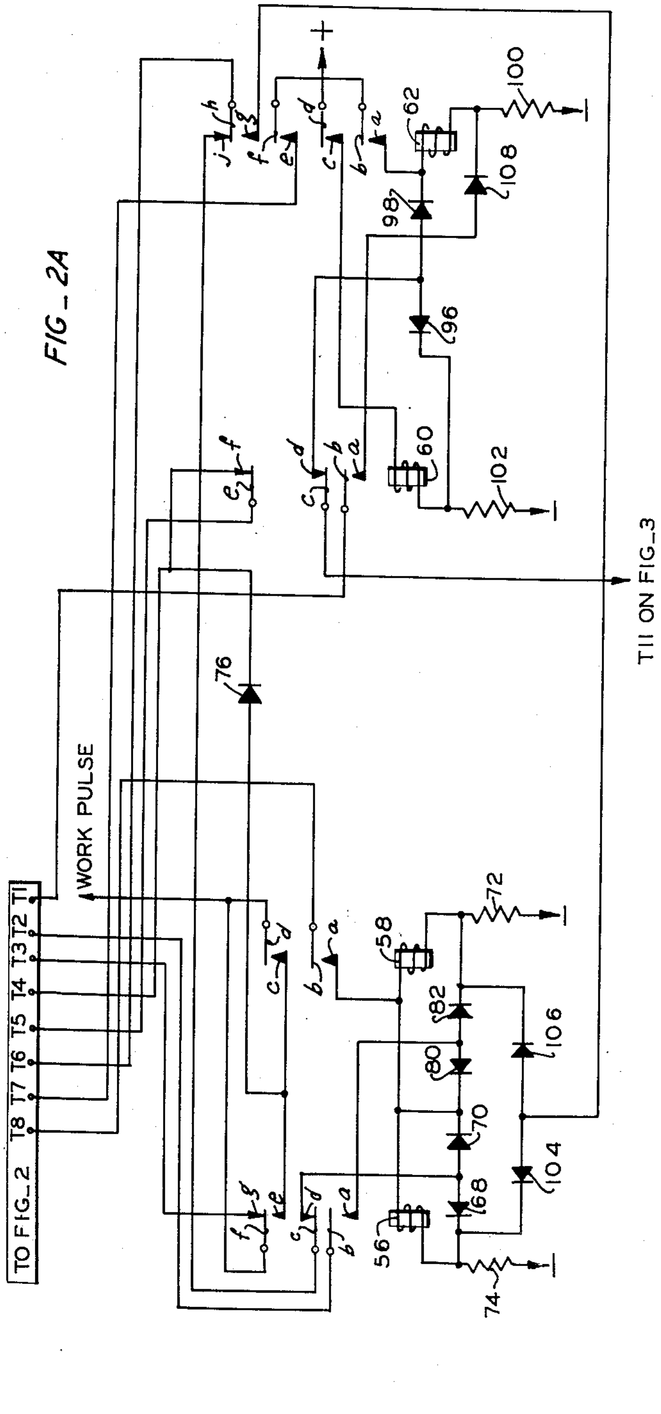
FIGURE 2A is a continuation of FIGURE 2.

Ten position stepping switch means 24 and twenty position stepping switch means 26, each of which is a multiple stepping level switch, is adapted to energize a unique combination of terminals of switches 18 and 20 for each timed second up to a maximum of 199 seconds. Twenty position switch 26, in the preferred embodiment of this invention, actually has only ten mechanical positions, but by consecutively utilizing two stepping levels has twenty electrical connections, one for each ten seconds of the elapsed time. The electrical connections, of switch 26, together with the auxiliary control relays, are described more fully hereinafter in connection with the description of FIGURES 2 and 2A. A timed stepping voltage pulse source 28 is adapted to generate one voltage pulse each second. Means for starting stepping switches 30 is connected to start the stepping of stepping switch means 24 and 26, means 32 for resetting stepping switches to zero position is adapted to reset stepping switch means 24 and 26 to their initial or starting position, and means for stopping and holding stepping switches 34 is adapted to stop and hold stepping switch means 24 and 26 in some particular position at a predetermined time. Means 34 is adapted to be controlled by means of multi-terminal relay 16, as described more fully hereinafter.

Switches 18A, 18B, 18C and any additional desired number of ten position switches, hereinafter designed "switches in the 18 column," may be connected to be aligned with the terminals of ten position stepping switch means 24. Twenty position switches 20A, 20B, and 20C, as well as additional desired twenty position switches, hereinafter designated "switches in the 20 column," equal in number to the number of ten position switches in the 18 column, may be connected to have their terminals connected to twenty position stepping switch means 26. Multi-terminal relays 16A, 16B and 16C and additional multi-terminal relays, hereinafter designated "relays in the 16 column," equal in number to the pairs of ten and twenty position switches in the 18 and 20 columns of FIGURE 1, may be connected to their respective ten and twenty position switches, as shown in representative manner in FIGURE 1. Diodes 22, 22A, 22B, 22C and additional diodes as needed, hereinafter designated "diodes in the 22 column," are connected to isolate the operation of multi-terminal relays, in the 16 column, to prevent the operation of one of the relays from interfering with other switching operations. Each of the multi-terminal relays in the 16 column is adapted, by means of a manually operated switch associated therewith, to control the operation of switching means 34, as described more fully hereinafter. Multi-tap switches 10A, 10B, 10C and as many additional multi-tap switches as desired, hereinafter designated "switches in the 10 column," have their fixed terminals connected in parallel so that when a pulse is routed to the movable arm of any switch in the 10 column, the respective video channel connected thereto is controlled. Multi-tap switches 12A, 12B, 12C and as many additional tap switches as desired, hereinafter designated "switches in the 12 column," have their fixed terminals connected in parallel so that when a pulse is routed to the movable arm of any switch in the 12 column, the respective audio channel connected thereto is controlled. Multi-tap switches 14A, 14B, 14C and as many additional switches as are desired, hereinafter designated "switches in the 14 column," have their fixed terminals connected in parallel to channel control voltages to various pieces of equipment. It is therefore evident that as many additional rows and columns of switches as desired may be utilized in the bank of switches of FIGURE 1. Additional switches are represented by the dotted lines extending downward from blocks 18C, 20C, 16C, 10C, 12C and 14C. Additional switches are also represented by the dotted lines extending to the right of blocks 14, 14A, 14B and 14C. The number of rows of switches are equal in number to the number of switches in 18, 20, and the relays in 16.

Stepping switches 36 and 38 each have four levels of switches mechanically attached to step together. Stepping switch levels 36A, 36B, 36C and 36D are connected to be operated by means of relay 36 while stepping switch levels 38A, 38B, 38C and 38D are connected to be operated by means of relay 38. Referring now to relay 36, terminal *e* and arm *f* is called an interrupter switch and is adapted to move into its arm upward position when a voltage has been applied across relay 36 long enough so that it is mechanically wound up and when released will move the stepping switch to its next position. When interrupter contact *e* is connected to the relay coil and arm *f* is energized with a positive voltage, this will cause relay 36 to step consecutively from position to position until the voltage is removed from arm *f*. Arms *h* and *k* are cammed to the shaft of the switches of relay 36 and are adapted to move into their arm upward position when relay 36 reaches a position wherein the movable arms of the various stepping levels contact terminal *a*, the fixed terminal which is electrically connected to the movable arm, hereinafter designated the "arm" position of the stepping switch.

Terminal *e* and arm *f* and terminal *g* and arm *h* are a pair of interrupter switches associated with relay 38 for self stepping purposes as seen above. Arm *k* and arm *n* of relay 38 are cammed to move into their arm upward position when the stepping levels associated with relay 38 move into their "arm" position.

Relay 40 is connected to reset relays 36 and 38 to their zero position (as shown). Relay 40 may be reset by means of reset switch 42 or by means of a voltage applied from movable arm *b* and terminal *c* of relay 44. Relay 44 is connected to close when relays 36 and 38 reach their zero position at terminal *b* to thereby remove voltage from the actuating coil of relay 40 and allow relay 40 to move into its relaxed or arm upward position. Relay 44 is a fast acting relay compared to relay 40 so that if relays 36 and 38 are in their zero position at terminals *b*, relay 40 does not close. Relay 44 is only used to energize relay 40 when the power is first turned on, provided the stepping switches 36 and 38 are not in position *b*.

When it is desired to start the timing operation of the device of this invention, start switch 46 is closed which causes relay 48 to close to thereby apply voltages to any pair of time selecting switches 18 and 20 which happen to be in the zero time position *b*. The closing of relay 48 also causes relay 50 to close which, in turn, is connected to start the timing circuit of relays 36 and 38.

Relay 36 is adapted to step consecutively from step *b* to step *m* for a period of nine seconds, at which time it channels a pulse to relay 38 to cause relay 38 to step one step from step *b* to step *c*. Relay 36 therefore counts the seconds while relay 38 counts periods of ten seconds per step. When relay 38 has counted nine steps and relay 36 has counted nine steps so that both relays 36 and 38 are on terminal *m*, 99 seconds have been counted and relays 52 and 54 close, as explained in detail hereinafter, to cause voltages to be shifted from the movable arm of stepping level 38C to the movable arm of stepping level 38B. The fixed terminals of stepping level 38C are connected to the first ten terminals *b* through *m* of twenty position switch 20, and all twenty position switches 20A, 20B, 20C and other switches in the 20 column, while the fixed terminals of stepping level 38B are connected to terminals *b'* through *m'* of twenty position switches 20, 20A, 20B, 20C and other switches in the 20 column. Consequently, when voltage is transferred from the movable arm of stepping level 38C, to the movable arm of stepping level 38B, the second travel or relay 38 through its ten active steps, *b* through *m*, causes twenty position switch 20 to have its terminals *b'* through *m'* consecutively activated each ten seconds.

Relays 56 and 58 are connected to control the operation of relay 50, the operate relay, as described more fully hereinafter. Relays 60 and 62 are connected to operate when stop switch 64, shown more particularly in FIGURE 3, or stop switches associated with relays 16A, 16B, 16C or other additional multi-terminal relays in the 16 column are closed.

When power is applied to the circuit of this invention, if relays 36 and 38 are in their position *b* (as shown in the drawings), relay 44 is caused to close through a circuit from the positive terminal of a voltage source (not shown) through the movable arm and terminal *b* of stepping level 36A, the movable arm and terminal *b* of stepping level 38A. If switches 36 and 38 are not in their position *b* when the power is applied to the device of this invention, a voltage is applied from terminal *c* of relay 44 across the coil of relay 40 in series with resistor 66 thereby closing relay 40 and moving it into its arm downward position. Relays 36 and 38 are then caused to step to position *b*, during which time relay 44 has been caused to close by the operation of relay 40. When relay 44 closes, a holding voltage is applied to terminal *a* of relay 44 from the positive terminal of a voltage source (not shown).

If switches 36 or 38 are in any of the positions *c* through *m*, a positive voltage is applied, either through stepping level 36B from the movable arm thereof or, if switch 36 happens to be in position *b* when switch 38 is not in position *b*, through the movable arm of stepping level 36A, and terminal *b* thereof, through the movable arm of stepping level 38A and terminals *c* through *m*, to the right hand terminal of reset switch 42. If reset switch 42 is closed when switches 36 and 38 are not in position *b*, a voltage is applied across the series combination of coil 40 and resistor 66, thereby closing relay 40 and moving it into its arm downward position.

When relay 40 closes and moves into an arm downward position, a holding voltage is applied across the series combination of coil 40 and resistor 66 from arm *b* and terminal *a* of relay 40. A voltage is applied through arm *d* and terminal *c* of relay 40, through terminal *g* and cammed switching arm *h* of relay 36, across the interrupter switch spring *f* and terminal *e* of relay 36 to cause relay 36 to self-step to its arm position *a*, at which position cammed switches *h* and *k* of relay 36 move into their arm upward position. A voltage is also applied through arm *k* and terminal *j* of relay 40, through terminal *j* and cammed switching arm *k* of relay 38, across interrupter switch spring *h* and terminal *g* of relay 38 to cause relay 38 to self-step to its arm position *a*, at which position cammed switches *k* and *n* of relay 38 move into their arm upward position.

When both relays 36 and 38 move into their arm position *n*, a circuit is made from the movable arm of stepping level 36A, through arm *c* and terminal *d* of relay 54, the movable arm of stepping level 38D and terminal *n* thereof to the junction between the coil of relay 40 and resistor 66, thereby placing the same potential on both ends of the coil of relay 40 which causes relay 40 to open or move to its arm upward position.

When relay 40 moves to its arm upward position, a positive voltage is applied through arm *d* and terminal *e* of relay 40 to terminal *j* and arm *h* of relay 36 thereby causing relay 36 to become energized. Simultaneously a positive voltage is applied through arm *k* and terminal *m* of relay 40 to terminal *m* and arm *k* of relay 38 causing relay 38 to become energized. Relay 36 has been prevented from de-energizing through the action of interrupter *e* and *f* by a circuit parallel with *e* and *f* of relay 38. This circuit consists of a connection from interrupter arm *f* of relay 36 to interrupter arm *f* of relay 38 through terminal *e*; to the movable arm level D of stepping switch 36D through terminal *n* back to terminal *e* of the interrupter of relay 36. When relay 38 is fully energized arm *f* and terminal *e* of the interrupter of relay 38 open permitting relay 36 to de-energize and in so doing move from its arm position *a* to position *b*, at which time arm *h* of relay 36 moves into its arm downward position, opening the circuit to the coil of relay 36. Relay 38 is prevented from de-energizing until after relay 36 de-energizes by a positive voltage applied through arm *g* and terminal *h* of relay 40 and terminal *m* and arm *k* of relay 36. When relay 36 has de-energized arm *k* will move to its arm downward position disconnecting from terminal *m* and permitting relay 38 to de-energize by moving from arm position *a* to arm position *b*. The purpose of the above circuitry is to urge relay 36 to position *b* just before relay 38 moves to position *b*.

When it is desired to start the timing operation of the device of this invention, relay 50 is normally in its relaxed or arm upward position. A voltage is applied through arm *n* and terminal *o* of relay 50, through switch 46, to the coil of relay 48 which causes relay 48 to move into its arm downward position.

When relay 48 moves into its arm downward position, a positive voltage is applied to terminal *b* of switching level 38C from the arm thereof, through terminal *f* and arm *e* of relay 52, and terminal *c* and arm *d* of relay 48. A voltage is also applied through terminal *a* and arm *b* of relay 48, arm *h* and terminal *j* of relay 62, arm *c* and terminal *d* of relay 56, to the junction between oppositely directed diodes 68 and 70. The conducting of diodes 68 and 70 causes equal voltages to appear at both ends of the coil of relay 56. The voltage which appears at the common terminal between the coils of relays 56 and 58 is applied across the series combination of the coil of relay 58 and resistor 72 thereby closing relay 58.

Relay 58 is connected so that when it closes, a holding voltage is applied through terminal *a* and arm *b* of relay 58, and through arm *k* and terminal *m* of relay 40 to cause relay 58 to remain closed until either this voltage is removed or a voltage of equal potential appears at the junction between the coil of relay 58 and resistor 72. When relay 58 moves into its arm downward position, the next work pulse, which is generated as described hereinafter, is applied through arm *d* and terminal *c*, through diode 76, through terminal *f* and arm *e* of relay 60 to the combination of the coil of relay 50 in series with resistor 78, energizing relay 50. This removes the positive voltage on relay 48 which was applied through arm *n* and terminal *o* of relay 50 thus de-energizing relay 48. The voltage which reached resistor 74 of relay 56 and prevented it from being in a state of potential operation is now removed by the opening of terminal *b* and contact *a* of relay 48.

The holding voltage which is applied to relay 58 is connected to be applied across the series combination of the coil of relay 56 and resistor 74 which causes relay 56 to close or move into its arm downward position. When relay 56 closes, or moves into its arm downward position, work pulses are channeled from arm *f* to terminal *e*, thence, as hereinbefore described, through rectifier 76.

Figure 4:
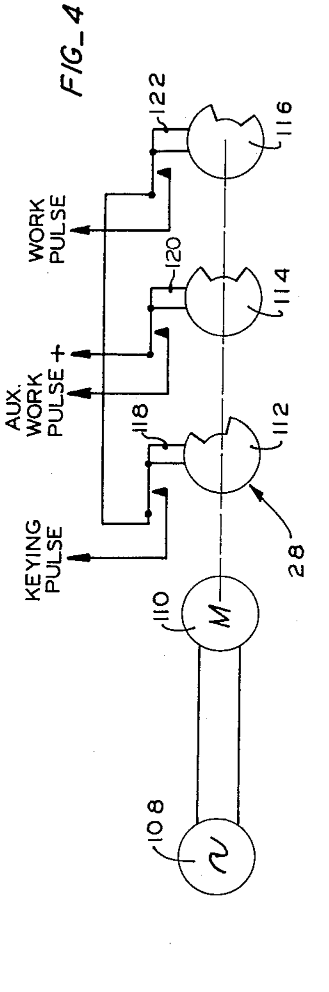
FIGURE 4 is a schematic diagram of a typical voltage pulse generating means adapted to be utilized in connection with the device of this invention.

The junction between oppositely directed diodes 80 and 82 is connected through terminal *a* and arm *b* of relay 56, and terminal *g* and arm *h* of relay 50 to a source of keying pulses, to be described more fully in connection with the description of FIGURE 4. When the next keying pulse is applied, the same voltage is applied to both ends of the coil of relay 58 thereby opening relay 58 while simultaneously applying a voltage across the series combination of the coil of relay 56 and resistor 74 maintaining relay 50 in its closed position. At the end of the keying pulse, the voltage is removed from relay 56 which causes relay 56 to open. When relay 50 closes, a holding voltage is applied to the series combination of the coil of relay 50 and resistor 78 through arm *b* and terminal *a* of relay 50, and through terminal *f* and arm *e* of relay 60.

Work pulses are channeled from a source of work pulses through arm *f* and terminal *g* of relay 56 when relay 56 is in its relaxed or arm upward position, through arm *d* and terminal *c* of relay 50, through arm *e* and terminals *d* and *f* of relay 52, to the movable arm of stepping level 38B or 38C respectively depending upon the position of arm *e* of relay 52. Relay 56 is initially in its arm upward position to channel work pulses to the movable arm of stepping level 38B or 38C almost immediately after relay 50 closes and before a closing pulse is applied to the coil of relay 56.

Keying pulses are applied through arm *k* and terminal *j* of relay 50 to the coil of relay 36 to cause relay 36 to step consecutively once each second.

The tenth keying pulse causes relay 36 to step to position *a*. Relay 36 thereupon immediately moves to position *b* and relay 38 simultaneously advances one position according to the following mechanism: when relay 36 reaches the "arm" position *a*, a voltage is applied through arm *d* and contact *e* of relay 40 and further through contact *j* and arm *h* of the cammed contacts of relay 36, and arm *f* and terminal *e* of the interrupter of relay 36, to energize the coil of relay 36. A voltage is similarly applied to the coil of relay 38 through terminal *h* and arm *g* of relay 40 and cammed arm *k* and terminal *m* of relay 36 resulting in the energizing of relay 38. Interrupter arm *f* and contact *e* are connected in parallel with interrupter arm *f* and terminal *e* of relay 36 through level D terminal *n* of relay 36. When relays 36 and 38 are fully energized, both their interrupter contact circuits will open, removing the voltage from relay 36 and allowing said relay to step. Contact *m* and cammed arm *k* of relay 36 will open, the voltage will be removed from relay 38 and the latter will step.

When both relays 36 and 38 are in their position *m*, a voltage is channeled from the movable arm of stepping level 36A and terminal *m* thereof through terminal *q* and arm *p* of relay 40, thence through the movable arm of stepping level 38D and terminal *m* thereof, through arm *b* and terminal *c* of relay 52 to apply voltage to the junction of oppositely directed diodes 84 and 86 which are connected to place the same potential at both ends of the coil of relay 52 while they apply a voltage across the series combination of the coil of relay 54 and resistor 88, thereby closing relay 54 to cause it to move into its arm downward position.

When relay 54 moves into its arm downward position, the circuit is opened through cammed arm *n* and terminal *o* of relay 38. The circuit between any reset voltage which appears at arm *e* of relay 54 for resetting relay 50 is interrupted. The circuit between terminal *n* of stepping level 36A and the arm of stepping level 38D is interrupted. A holding voltage for relay 54 is applied through terminal *m* and arm *k* of relay 40 is applied through arm *b* and terminal *a* of relay 54.

When relay 36 steps to step *n* after the next keying pulse, the voltage is removed from the junction of diodes 84 and 86, the junction between the coil of relay 52 and resistor 90, thereby causing the holding voltage of relay 54 to be applied across the series combination of the coil of relay 52 and resistor 90 which causes relay 52 to close or move into its arm downward position.

When relay 52 moves into its arm downward position, arm *b* moves from terminal *c* to terminal *a* of relay 52 so that when relays 36 and 38 again simultaneously reach their position *m*, a voltage is applied between oppositely directed diodes 92 and 94 which causes an equal voltage to be applied across both ends of coil 54 which opens relay 54. When relay 52 moves into its arm downward position, work pulses which appear at arm *e* of relay 52 are routed to terminal *d* rather than terminal *f* of relay 52 to thereby appear on the movable arm of stepping level 38B instead of 38C.

When relay 54 is opened, relay 52 is held in its closed or arm downward position for one additional second by the voltage applied between diodes 92 and 94. When relay 36 moves to position *n* relay 54 is in its arm upward position whereby a voltage is applied from the movable arm and terminal *n* of stepping level 36A through terminal *d* and arm *c* of relay 54, thence through the arm of stepping level 38D and terminal *m* thereof, through arm *b* and terminal *a* of relay 52. Upon reaching position *n*, relay 36 advances to position *b*. At the same time relay 38 advances to position *n*, as seen before. Relay 52 then moves into its relaxed arm upward position because its energizing circuit is broken at terminal *m* of relay 38.

A complete circuit extends from the positive voltage source through the movable arm and terminal *b* of relay 36 level A to the movable arm and terminal *n* of relay 38 level A and further through arm *e* and terminal *f* to resistor 78, resulting in an equal voltage on both sides of relay coil 50 and the de-energizing thereof. The ensuing opening of arm *k* and contact *j* of relay 50 prevents keying pulses from reaching relay 36 and further stepping it. When relay 50 opens, arm *d* is disconnected from terminal *c* of that relay and prevents any further work pulses from reaching relays 36 and 38. A voltage is applied to relay coil 38 from arm *k* and terminal *m* of relay 40 through contact *m* and cammed arm of relay 38 and further through interrupter contact *g* and arm *n* of relay 38. Relay 38 will then step to position *b*. Now the system can only be activated by closing the start switch.

When stop switch 64, shown more particularly in FIGURE 3, or any additional stop switches associated with relays in the 16 column are closed, the positive source applied to arm *h* of relay 16 may be caused to effect the following operations. When relay 16 closes at the particular time that is set into the position of time selecting switches 18 and 20, the positive potential is applied through arm *c* and terminal *d* of relay 60 to the junction between oppositely directed diodes 96 and 98. When a voltage appears at the junction between diodes 96 and 98 the voltage appears across the series combination of the coil of relay 62 and resistor 100 thereby causing relay 62 to close or move into its arm downward position.

The circuit is opened between terminal *a* of relay 48 and arm *c* of relay 56. Arm *h* of relay 62 is connected with terminal *g* thereof so that in the event that relay 48 closes, voltage is applied to the junction between oppositely directed diodes 104 and 106 which are connected to the junction between the coil of relay 56 and resistor 74 and to the junction between the coil of relay 58 and resistor 72, respectively, to prevent relays 56 and 58 from closing, or to open relays 56 and 58 if they are already closed.

When relay 62 moves into its arm downward position, a positive holding voltage is applied between arm *b* and terminal *a* of relay 62. A positive voltage is applied from arm *f* through terminal *e* of relay 62 to the coil of relay 36 which causes relay 36 to energize. A positive voltage is applied from arm *d* through terminal *c* of relay 62 across the series combination of the coil of relay 60 and resistor 102. When relay 16 opens after the work pulse is over, the voltage is removed from the junction between diodes 96 and 98 and relay 60 closes. The holding voltage circuit of relay 50 is broken by the opening of arm *e* and contact *f* of relay 60, thus de-energizing relay 50.

When relay 60 moves into its arm downward position, the circuit between switch 64 and the junction between diodes 96 and 98 is opened. Terminal *b* is connected to terminal *a* of relay 60 to thereby connect the junction between the coil of relay 62 and resistor 100 through diode 108 to a source of keying pulses which are supplied through arm *k* and terminal *m* of relay 50. When the next keying pulse arrives, a voltage is applied to the junction between the coil of relay 62 and resistor 100 which causes relay 62 to open to thereby open relay 60.

When relay 50 moves into its arm upward position, keying pulses to relay 36 are interrupted and a voltage is connected to switch 46 which, in turn, is adapted to be closed to re-close relay 48 and restart the timing switches.

Referring now to FIGURE 3, each ten position time selecting switch 18 is adapted to be set to correspond to a particular second of a ten second time segment, while each position of twenty position switch 20 is adapted to be set to a setting which corresponds to a particular ten second time segment within a 199 second time segment. Each of the fixed terminals *b* through *m* respectively of switch 18, is connected to the fixed terminal, *b* through *m* respectively, of stepping level 36C of FIGURE 2. Each of the ten terminals of switch 20, *b* through *m* respectively, are connected to fixed terminals *b* through *m* of stepping level 38C of FIGURE 2. Fixed terminals *b'* through *m'* of switch 20 are connected, respectively, to fixed terminals *b* through *m* of stepping level 38B of FIGURE 2. Diode 22 is an isolating diode which is adapted to prevent the operation of one of the combination of ten and twenty position time selecting switches in the 18 and 20 columns, from interfering with the electrical operation of the remaining ten and twenty position switches in the 18 and 20 columns. When the arms of both switches 18 and 20 are positioned opposite activated terminals, current flows through the coil of relay 16 which causes relay 16 to close.

When relay 16 closes, a positive potential is supplied to arm *h* and terminal *g* of relay 16 to provide a voltage source for the effective operation of stop switch 64. Video power sources which are connected to arm *f* are now transferred to the movable arm of multi-tap function selecting switch 10. Multi-tap switch 10 is shown, by way of example, with only four fixed terminals. Obviously, switch 10 can have as many fixed terminals as there are video channels which are desired to be controlled. An audio power source is connected through arm *d* and terminal *c* to the movable arm of multi-tap function selecting switch 12. Switch 12 is also shown, for example purposes, with only four terminals. It is apparent that switch 12 can have as many fixed terminals as there are audio channels which are desired to be controlled. Equipment power is applied through arm *b* and terminal *a* of relay 16 to the movable arm of switch 14. Switch 14 also is shown, by way of example, with only four terminals. Obviously additional tapped switches other than switches 10, 12 and 14 can be added, and additional pairs of terminals and arms of relay 16 can be added.

As to the common disconnect auxiliary work pulses are generated, as described hereinafter, to be applied to arm *k*. When relay 16 moves into its arm downward position, auxiliary pulses are connected to terminal *j* of relay 16 which then channels voltage to relays (not shown) which are adapted to disconnect previously controlled equipment.

Referring now to pulse source 28 of FIGURE 4 a source of alternating voltage 108 is connected to drive constant speed motor 110 which is mechanically connected to drive cams 112, 114 and 116. Cams 112, 114 and 116 are positioned at different angles upon the shaft of motor 110 and have different dwell times. Followers 118, 120 and 122 cause positive voltage to be connected during the dwell time of each cam, respectively, to generate keying pulses, auxiliary work pulses, and work pulses of the required timed duration and of the required time separation. It is preferable to operate cams 112, 114 and 116 so that a pulse is generated once each second.

Thus in the particular embodiment of this invention which is shown, the ten position stepping switch means 24 includes relay 36, while the twenty position stepping switch means 26 includes relay 38, relays 52 and 54 together with their associated diodes and resistors. Means for stopping and holding stepping switches 34 includes relays 60 and 62 together with their associated diodes and resistors. Means 30 for starting stepping switches includes switch 46, relays 48 and 50 together with relays

56 and 58 and their respective diodes and resistors. Means 32 for resetting stepping switches to their zero position includes relays 40 and 44 together with resistor 66. Timed stepping pulse source 28 includes motor 110, cam 112, 114, 116 and followers 118, 120, and 122. It is to be noted that this classification of parts is by way of example only and does not preclude the use of other circuitry within the spirit and scope of the invention.

In operation, power is supplied to motor 110 which turns cams 112, 114 and 116 which, in turn, generate keying pulses, work pulses, and auxiliary work pulses.

If relays 36 and 38 are in their position *b* (as shown in the figures), relay 44 operates and is held closed by its own holding voltage. If relays 36 and 38 are not in their position *b*, a voltage is applied to relay 40 which causes relay 40 to move into its arm downward position to thereby cause relays 36 and 38 to step to their arm position at positions *a* and *n*, at which position relay 40 is caused to open. When relay 40 opens, relays 36 and 38 are stepped to position *b*. The timer is now ready to be started.

Figure 1:
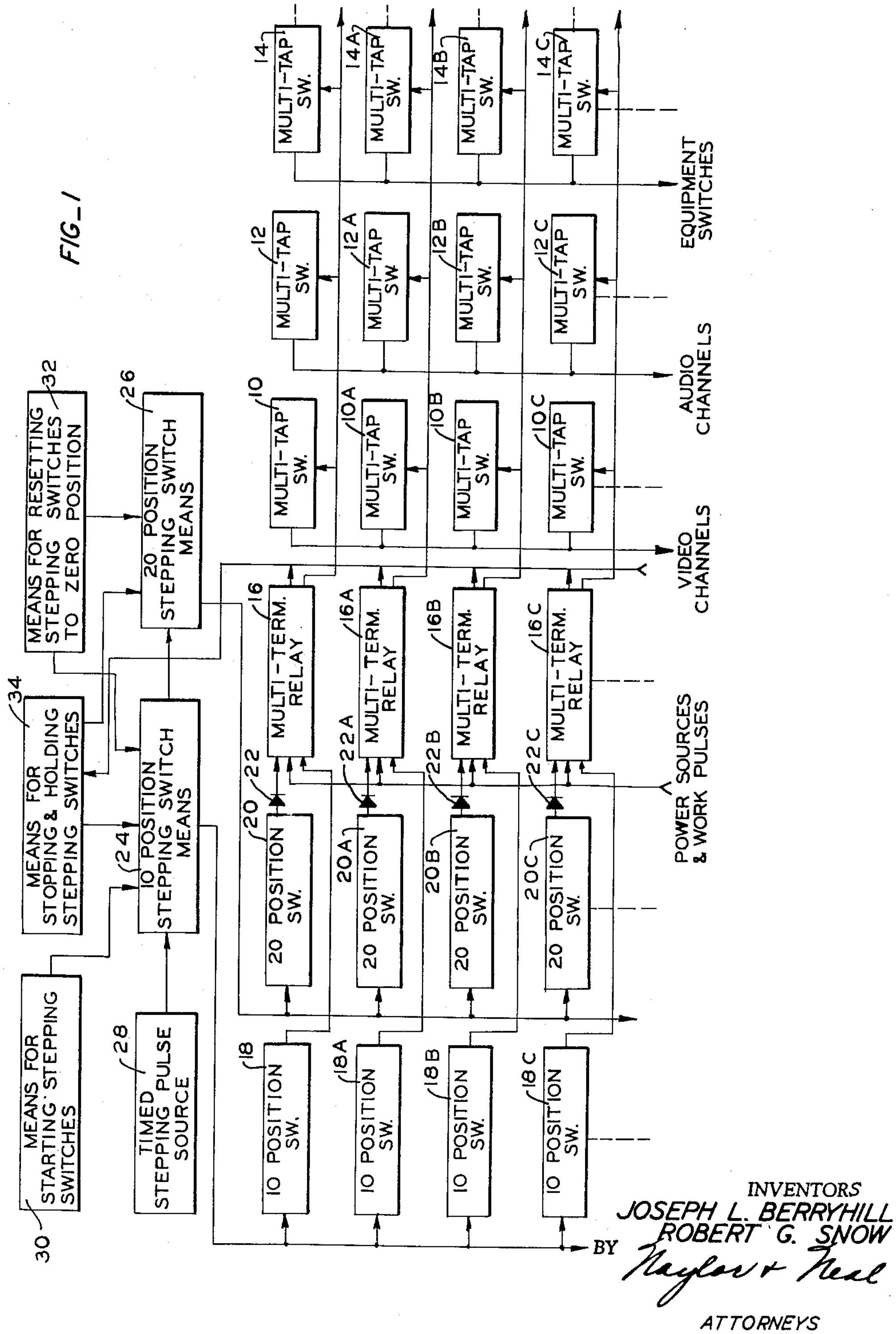
FIGURE 1 is a block diagram of a typical embodiment of the device of this invention.

Switches 10, 12 and 14 or other switches in the 10, 12 or 14 columns of the bank of switches shown in FIGURE 1 are manually set to a desired switch setting. Switches 18 and 20 or other time selecting switches in the 18 or 20 column of the bank of switches shown in FIGURE 1 are set for a particular time setting at which time voltages are channeled to the movable arms of the switches in the 10, 12 and 14 columns. After the desired switches of the bank of switches shown in FIGURE 1 are set, the start switch 46 is thrown which causes relay 48 to close. When relay 48 closes any row of switches in the 18 and 20 columns of FIGURE 1 which is set at the zero time position *b* causes its associated relay in the 16 column to close.

Relays 58 and 56 are actuated to cause relay 50 to close and channel stepping pulses to relay 36. When relay 36 steps to its tenth step, it sends a pulse to relay 38 to cause relay 38 to step one step.

After relays 36 and 38 have been stepping for 99 seconds, relays 54 and 52 close consecutively which transfers work pulses from the movable arm of stepping level 38C to the movable arm of stepping level 38B, whereby continued stepping of relays 36 and 38 counts off the seconds in the time segment from 100 to 199 seconds.

When the setting of individual time selecting switches in the 18 and 20 columns of FIGURE 1 instantaneously coincide with the corresponding position of relays 36 and 38, the connected multi-terminal relay in column 16 closes to channel control voltages to the movable arms of multi-tap function selecting switches in that particular row. The multi-tap function selecting switches in that particular row then channel voltages to whichever pieces of equipment, or other devices, have been selected by the setting of the particular multi-tap function selecting switches.

In the event that it is desired to stop the timer stepping switches at a particular time, stop switch 64 of multi-terminal relay 16, or other switches in multi-terminal relays in the 16 column is closed. When that particular relay closes, relays 62 and 60 are moved into their arm downward position which causes relay 50 to open. When relay 50 opens, switch 46 is placed in a position whereby voltage may again be applied to relay 48 to continue the timing count of the stepping switches where it left off.

In the event that it is desired to reset all of the switches to their initial position *b* of relays 36 and 38, reset switch 42 is closed which causes relay 40 to close to reset relays 36 and 38 to position *a*. When relay 40 then opens, switches 36 and 38 are stepped one additional step to position *b* and the timing process may then be re-started from the zero time setting.

Consider a simple switching sequence. Suppose it is desired to, in sequence (1) start a motion picture projector (2) eight seconds later, connect the particular video and audio channel associated with the motion picture projector to their respective transmitters (3) ten seconds later, start a tape recorder with a special announcement and present the call letters of the station on the video channel, and (4) thirty seconds later, disconnect the previously connected video and audio channels while connecting a pair of video and audio channels. Suppose further that the new program is to be an untimed program segment such as a wrestling match.

Switches 18 and 20 are set at position *b*. Switch 14 is set at position *b*. Switches 10 and 12 are set at an open position.

Switch 18A is set at position *k* while switch 20A is set at position *b*. Switch 14A is set at position *b*. Switches 10A and 12A are set to position *b*.

Switch 18B is set at position *k* while switch 20B is set at position *c*. Switches 10B and 12C are set at position *c*. Switch 14B is set to position *c*.

Switch 18C is set at position *k* while switch 20C is set at position *f*. Switches 10C and 12C are set at position *d*. Switch 14C is set at an open position.

At some desired time an operator closes switch 46 which closes relay 48. When relay 48 closes, a pulse is channeled to relay 16, closing it which causes switch 14 to send a control voltage to a relay (not shown) which starts the moving picture projector.

Switch 36 starts stepping one step each second. After eight seconds switching levels 36C and 38C align with switches 18A and 20A to close relay 16A which channels control voltage to connect the audio and video signals to their respective transmitters. Setting switch 14A to position *b* prevents the motion picture projector from being turned off by the common disconnect.

After another ten seconds, switching levels 36C and 38C align with switches 18B and 20B to close relay 16B which channels control voltages through switches 10B and 12C to connect the station call letters to the video and to connect the audio channel to the tape recorder. Switch 14B channels a control voltage to start the tape recorder. The motion picture projector and its associated video and audio channels are automatically shut off by the common disconnect.

After still another thirty seconds, switching levels 36C and 38C align with switches 18C and 20C to close relay 16C which channels control voltages through switches 10C and 12C to connect new video and audio channels to their respective transmitters. Auxiliary work pulses are connected to disconnect the previously energized equipment. Relay 62, then relay 60 closes which opens relay 50 and stops the timing cycle.

After the untimed segment is complete, switch 46 may be reclosed to continue the timing sequence.

There has thus been provided by the device of this invention a novel switching circuit which is adapted to flexible use in the programming of a television station and the connecting of the station equipment to video and audio transmitters at the proper times. Means have also been provided which is adapted to connect and disconnect recording equipment, moving picture lamp dousers, stage lights and the like in proper sequence.

What is claimed is:

1. Electrical control apparatus for operating a plurality of units of equipment at predetermined times in a program period which comprises: a timed-stepping switch having a movable arm and a plurality of contacts, generator means for electrically energizing said movable arm, indexing means for sequentially moving said stepping switch arm one step during each short time interval in said program period to energize said contacts in sequence, at least four adjustable switches each having the same number of contacts as said timed-stepping switch, means connecting the contacts of each adjustable switch to the contacts of said timed stepping switch and in parallel with the contacts of the other adjustable switches, an adjustable switching conductor associated with each of said adjustable switches for connection to its contacts to select one of said switch contacts so that said conductor will be energized from said selected contact when the contact of said timed-stepping switch to which said selected contact is connected is energized, at least four primary relays one having its coil connected to said switching conductor of each of said adjustable switches whereby operation of each of said primary relays is controlled by one of said adjustable switches, a plurality of units of equipment to be controlled, and multitap switch means connecting each of said units of equipment in parallel to the switching terminals of at least four of said primary relays whereby each of said units of equipment may be operated by any one of four of said adjustable switches, and a plurality of said units of equipment may be operated simultaneously by each of said adjustable switches.

2. The electrical control apparatus of claim 1 in which said plurality of units of equipment comprises a plurality of type groups each type group including a plurality of units of equipment of a particular type; at least as many independent multitap switch means are connected in parallel to the switch terminals of each relay as there are groups of equipment to be controlled, and the units of equipment of each group are connected to one independent multitap switch means associated with each relay, whereby a bank of equipment consisting of one unit of equipment of each group can be operated simultaneously by each of said adjustable switches, and said bank of equipment can be operated by a pair of adjustable switches to permit the units of said bank to operate for overlapping periods of time while permitting continuous operation of a plurality of banks of equipment controlled by said timed-stepping switch.

3. The apparatus of claim 1 in which the duration of said program period is from two to five minutes and in which said apparatus includes a manually-closable start switch connected to start operation of said indexing means and relay means associated with said start switch for conducting an electric pulse to said movable arm of said stepping switch prior to operation of said indexing means said relay means limiting the maximum and minimum duration of said electric pulse.

4. The apparatus of claim 3 characterized further by the inclusion of a selectively-closable stop switch connected in series with the switching terminals of one of said primary relays, and connected to interrupt operation of said indexing means responsive to the concurrent closing of said stop switch and said primary relay to which it is connected.

5. The apparatus of claim 4 characterized further by the inclusion of second relay means associated with said stop switch for stepping said stepping switch one step after the concurrent closing of said stop switch and said primary relay to which it is connected.

6. The apparatus of claim 5 characterized further by the inclusion of means for automatically resetting said stepping switch means to a zero position responsive to interruption of the power supply to said apparatus, said means being connected to be operable before closing of said start switch.

7. The electrical control apparatus of claim 1 characterized further in that said generator means comprises a pulse generator having a keying pulse output and a work pulse output and adapted to generate a keying pulse and a work pulse during each small interval of time in said program period; and control means are provided for said apparatus comprising: a start switch, a start relay connected to be energized by said start switch and having first and second pairs of normally-open switch terminals the first pair being connected to said movable arm to conduct working power to said movable arm when said start relay is energized, and a stepping switch control relay having three pairs of normally-open switch terminals and one pair of normally-closed switch terminals, the coil of said control relay being connected to be energized alternatively by connection to said work pulse output responsive to closing of said second pair of terminals on said start relay and by connection to a source of relay holding voltage through a first pair of its own normally-open terminals, the second pair of normally-open terminals on said control relay being connected between said movable arm and said work pulse output, the third pair of normally open terminals being connected between said keying pulse output and said indexing means, and said pair of normally-closed terminals on said control relay being connected to the coil of said start relay in series with said start switch whereby said movable arm receives an energizing power pulse before said indexing means receives a keying pulse and the duration of said power pulse is at least as great as the switching time of said control relay and less than the period between two of said work pulses.

8. The apparatus of claim 7 in which said stepping switch has first and second pluralities of fixed contacts, a first switch arm operable to connect sequentially with each fixed contact of said first plurality and a second switch arm operable in unison with said first switch arm to connect sequentially with each fixed contact of said second plurality while said first arm is connecting with said first plurality, said indexing means operating said arms through repetitive cycles of sequential connection with said fixed contacts; a third relay is provided and is operable to connect an arm thereof to either arm of said stepping switch selectively, said relay arm being connected to said first pair of start-relay terminals and said second pair of normally-open terminals of said control relay, and means is provided operating said third relay upon completion of an operating cycle of whichever stepping switch arm it is connected to to connect said relay arm to the other stepping switch arm, whereby an electrical circuit is completed from said work pulse output to each fixed contact of said first and second pluralities in sequence.

9. The apparatus of claim 8 characterized further by the inclusion of means associated with said third relay for deenergizing the coil of said control relay when said third relay switches to one of its switching positions.

10. The apparatus of claim 7 characterized further by the inclusion of a resetting relay and a manually-operable resetting switch connected to the coil of said resetting relay to energize said resetting relay, said resetting relay having first and second sets of switch terminals connected to said indexing means and said control relay respectively to index said stepping switch to a starting position and to de-energize the coil of said control relay respectively when said resetting relay is energized.

11. The apparatus of claim 10 characterized further by the inclusion of a manually-operable stop switch connected to said control relay to de-energize the coil of said control relay independently of said resetting relay.

12. The apparatus of claim 10 characterized further by the inclusion of a fifth relay having a normally-closed switch and a normally-open switch with its coil connected to the power supply of said apparatus through its own normally-open switch and with the coil of said resetting relay connected to said power supply through the normally-closed switch of said fifth relay independently of said resetting switch, said resetting relay having a third set of normally-open switch terminals connected to the coil of said fifth relay to energize said fifth relay whereby said fifth relay effects operation of said resetting relay and resetting of said stepping switch to said zero position after interruption of the power supply to said apparatus.

13. Apparatus for programming timed-working pulses which comprises a pulse generator having a keying pulse output and a work pulse output and adapted to generate a keying pulse and a work pulse during each small interval of time in a program period during which work pulses are to be programmed, a stepping switch having a plurality of output terminals and a movable arm connectable sequentially with said terminals, indexing means for stepping said arm sequentially over said terminals responsive to keying pulses, and means for controlling the operation of said stepping switch comprising: a start switch, a start relay connected to be energized by said start switch and having first and second pairs of normally-open switch terminals the first pair being connected to said movable arm to conduct working power to said movable arm when said start relay is energized, and a stepping-switch-control relay having three pairs of normally-open terminals and a pair of normally-closed switch terminals, the coil of said control relay being connected to be energized alternatively by connection to said work-pulse output responsive to closing of said second pair of terminals on said start relay and by connection to a source of relay holding voltage through a first pair of its own normally-open terminals, a second pair of normally-open terminals on said control relay being connected between said movable arm and said work-pulse output, the third pair of normally-open terminals on said control relay being connected between said indexing means and said keying-pulse output, and said pair of normally-closed terminals on said control relay being connected to the coil of said start relay in series with said start switch whereby said movable arm of said stepping switch receives an energizing power pulse before said indexing means receives a keying pulse and the duration of said power pulse is at least as great as the switching time of said control relay and less than the period between two of said work pulses.

14. The apparatus of claim 13 in which said stepping switch has first and second pluralities of fixed contacts, a first switch arm operable to connect sequentially with each fixed contact of said first plurality and a second switch arm operable in unison with said first switch arm to connect sequentially with each fixed contact of said second plurality while said first arm is connecting with said first plurality, said indexing means operating said arms through repetitive operating cycles of sequential connection with said fixed contacts; a third relay is provided and is operable to connect an arm thereof to either arm of said stepping switch selectively, said relay arm being connected to said first pair of start-relay terminals and said second pair of normally-open terminals of said control relay, and means is provided operating said third relay upon completion of an operating cycle of whichever stepping switch arm it is connected to to connect said relay arm to the other stepping switch arm, whereby an electrical circuit is completed from said work-pulse output to each fixed contact of said first and second pluralities in sequence.

15. The apparatus of claim 14 characterized further by the inclusion of means associated with said third relay for de-energizing the coil of said control relay when said third relay switches to one of its switching positions.

16. The apparatus of claim 13 characterized further by the inclusion of a resetting relay and a manually-operable resetting switch connected to the coil of said resetting relay to energize said resetting relay, said resetting relay having first and second sets of switch terminals connected to said indexing means and said control relay respectively to index said stepping switch to a starting position and to de-energize the coil of said control relay respectively when said resetting relay is energized.

17. The apparatus of claim 16 characterized further by the inclusion of a manually-operable stop switch connected to said control relay to de-energize the coil of said control relay independently of said resetting relay.

18. The apparatus of claim 16 characterized further by the inclusion of a fifth relay having a normally-closed switch and a normally-open switch with its coil connected to the power supply of said apparatus through its own normally-open switch and with the coil of said resetting relay connected to said power supply through the normally-closed switch of said fifth relay independently of said resetting switch, said resetting relay having a third set of switch terminals connected to the coil of said fifth relay to energize said fifth relay whereby said fifth relay effects operation of said resetting relay and resetting of said stepping switch to said zero position after interruption of the power supply to said apparatus.

References Cited in the file of this patent

UNITED STATES PATENTS

| | | |
|---|---|---|
| 1,810,732 | Sanner | June 16, 1931 |
| 2,042,901 | Kast | June 2, 1936 |
| 2,059,919 | Teubner | Nov. 3, 1936 |
| 2,178,112 | Barker | Oct. 31, 1939 |
| 2,563,127 | McGoffin | Aug. 7, 1951 |
| 2,565,611 | Kovach | Aug. 28, 1951 |
| 2,763,819 | Bradshaw | Sept. 18, 1956 |
| 2,811,202 | Schild | Oct. 29, 1957 |
| 2,930,941 | Neidenberg | Mar. 29, 1960 |
| 2,947,803 | Hanley | Aug. 2, 1960 |

OTHER REFERENCES

Rymsha: "Robot Circuit Tester," pages 55–57 of Radio-Electronics Magazine, July 1956.